Figures 3, 4:
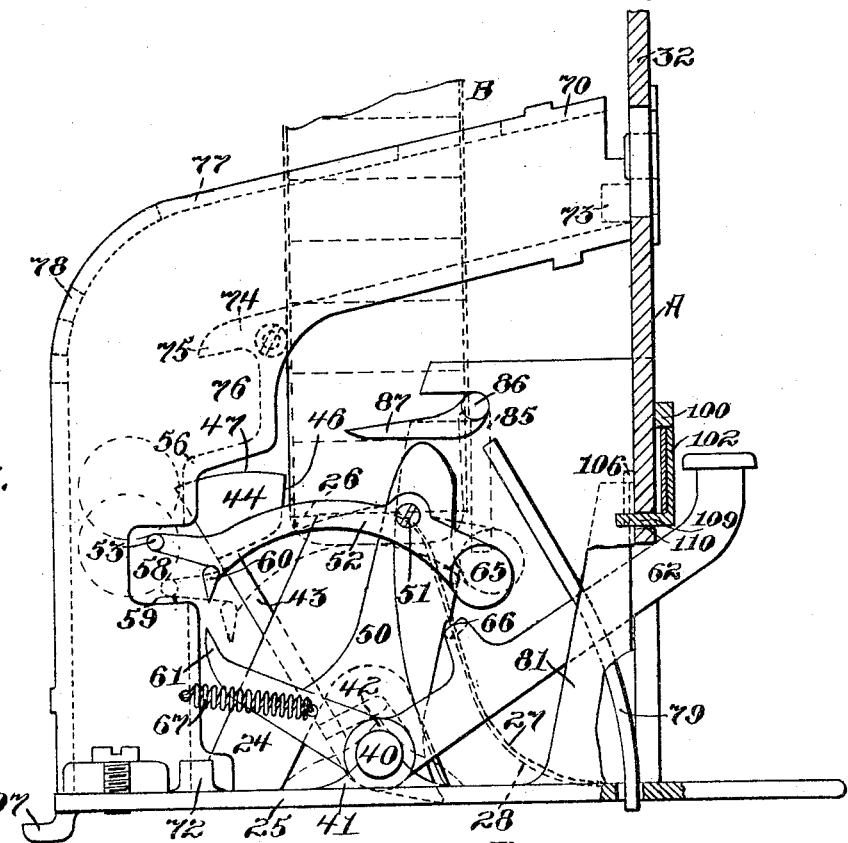

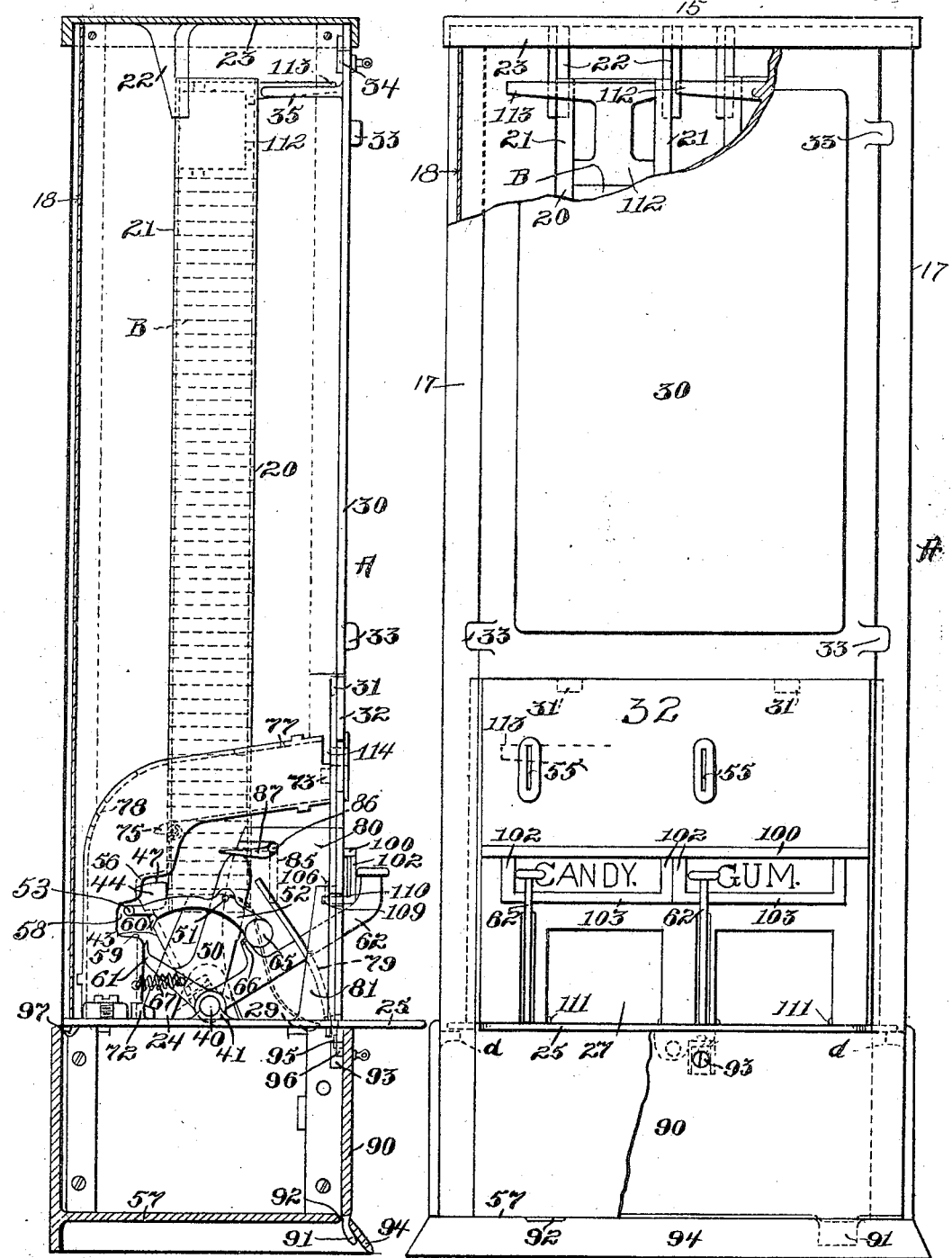

No. 803,217. PATENTED OCT. 31, 1905.
F. J. DOLE.
DELIVERY CABINET.
APPLICATION FILED JAN. 18, 1904.

3 SHEETS—SHEET 2.

Witnesses:
Robert Adt
C. C. Fuss

Inventor:
Frederick J. Dole,
By his Attorney,
F. H. Richards.

No. 803,217. PATENTED OCT. 31, 1905.
F. J. DOLE.
DELIVERY CABINET.
APPLICATION FILED JAN. 18, 1904.
3 SHEETS—SHEET 3.
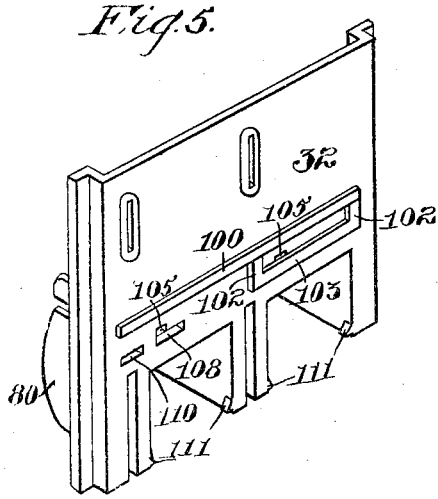
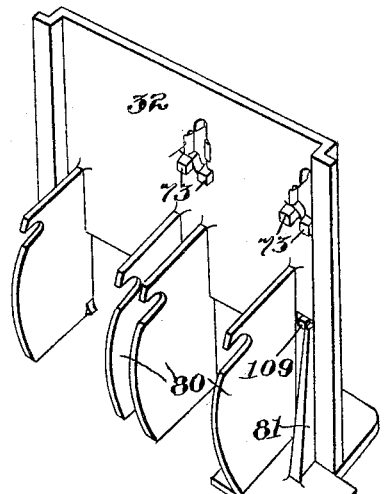
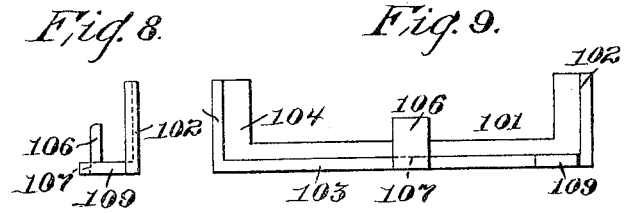
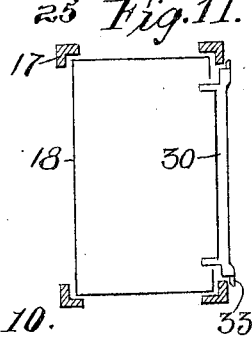
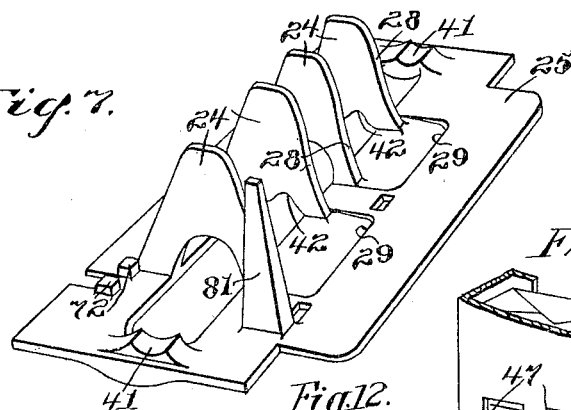
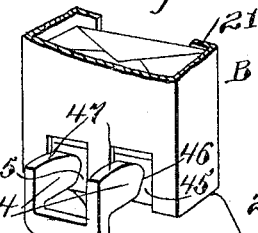
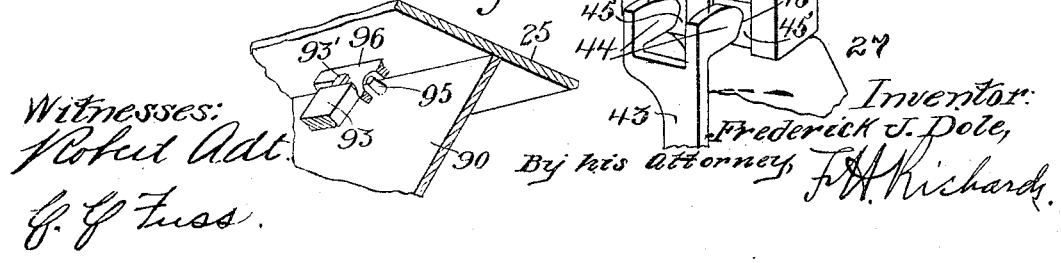

UNITED STATES PATENT OFFICE.

FREDERICK J. DOLE, OF NEW YORK, N. Y., ASSIGNOR TO THE GREAT AMERICAN AUTOMATIC VENDING MACHINE COMPANY, OF HOBOKEN, NEW JERSEY, A CORPORATION OF NEW JERSEY.

DELIVERY-CABINET.

No. 803,217.    Specification of Letters Patent.    Patented Oct. 31, 1905.

Application filed January 18, 1904. Serial No. 189,445.

*To all whom it may concern:*

Be it known that I, FREDERICK J. DOLE, a citizen of the United States, residing in New York, borough of Manhattan, in the county of New York and State of New York, have invented certain new and useful Improvements in Delivery-Cabinets, of which the following is a specification.

This invention relates to and has for an object to provide an improved delivery-cabinet and one which is peculiarly adapted for coin-controlled apparatus and automatic vending-machines.

In the drawings accompanying and forming a part of this specification a form of my invention is illustrated, wherein—

Figure 1 is a front view of a vending-machine embodying the present improvement with parts of the upper and lower portions of the casing broken away to reveal the mechanism and organization within. Fig. 2 is a side view of the same with the side of the casing removed. Fig. 3 is an enlarged detail of the working parts of the delivery mechanism. Fig. 4 is a view of similar parts, showing them in the position of delivering a package of merchandise. Figs. 5 to 9, inclusive, show in perspective various portions of the apparatus. Fig. 10 is a detail in perspective of the lower portion of the package-chute and the ejector. Fig. 11 is a cross-sectional detail of the upper part of the cabinet, and Fig. 12 is a perspective view of a locking device.

Like characters of reference refer to similar parts in the various views.

The mechanism and the merchandise to be dispensed thereby may be contained in some suitable casing (designated herein in a general way by A) and which casing in the present instance comprises top and bottom members (designated, respectively, in a general way by 15 and 16) connected by corner-stanchions 17, (shown as angle-irons,) which not only serve to unite the top and bottom of the casing, but also protect the sheathing of the casing (designated by 18) and in the present instance made of sheet metal bent into shape and having its corners protected by the stanchions which outline the sheathing, thus forming panels adapted for the reception of ornamentation, advertisments, or instructive legends. The sheet metal constituting the panels may be in a single piece bent into shape to produce in the form herein illustrated side and back panels and having corners conforming in a degree to the angle-irons, and as the door occupies substantially all the space of the front panel the sheet metal may end adjacent to the inner edges of the angle-irons flanking such panel-space. The width of the sheet metal underlying the angle-irons at the front may be comparatively narrow, but sufficiently wide to give stability to the corner of such metal to sustain the side panels. The sheet metal will by its springiness press against the corner-pieces and securely remain in position and make recourse to securing means unnecessary. The packages of merchandise (designated in a general way by B) are shown herein arranged one upon the other in a chute contained in the casing and running from a point at substantially the top thereof down past the operating mechanism and opening out in a chute to the outside of the machine. The chute is indicated in the present instance by the reference character 20. Two of such chutes are shown in the present illustration and two sets of coin-controlled mechanism. The chutes may be substantially in the form of the packages which will be dispensed and may have an opening down the front, edges or flanges 21 projecting inwardly to engage some portion of the packages and prevent the same from displacement. The upper portion of each chute is engaged by corner-brackets 22, dependent from the top plate 23 of the frame. The chutes are shown resting upon standards 24, carried upon a plate, (indicated by 25,) which plate in the present instance comprises the bed-plate of the mechanism for operating the apparatus, supported by lugs $d$ on the base, as shown in Fig. 1. The chutes if made of sheet metal may have the back portion bent transversely to the passage of the chute, and such bent portion is shown comprising a bottom 26, which will rest upon such standards 24 and may have a portion 27 continuing down the faces 28 of the standards 24 and abutting shoulders 29 at the margin of a recess formed in the bed-plate, whereby the delivery-chute for the packages of merchandise is provided and which is in such a form as to make neat joints and strong construction and one not liable to readily become disorganized.

Access may be had to the inside of the casing to replenish the chutes as they may become empty. The opening to afford such access to the casing may be closed by means of a door 30, having faces, in the present instance upon lugs 31, to engage the back and edge of a plate, (indicated by 32,) which may be fastened in some suitable manner to the casing. The plate 32 is in the present instance connected with the ejector mechanism and is readily detachable and removable from the casing therewith and which plate 32 forms a partial closure for the opening in the casing. The connection between the door and the edge of such plate affords a hinge upon which the door may be swung outwardly, and when the door is in its closed position the engaging faces will act to hold it in such position at that point. The hinge thus afforded is one which is normally constituted for disassemblage. The door may also be provided with faces, in the present illustration carried by lugs 33, which faces are adapted to overlap the sides of the frame. The door in practice may have a batten or rabbet to afford a tight juncture and to cover the meeting edges of the door and its jamb. The upper part of the door may be held in place by means of some suitable key-operated lock 34, and the rear of such door is shown having a flange or plate 35, which will engage the chutes and hold them pressed against the corner-braces 22, so that locking the door in place will also lock the chutes in place.

This present invention may be used in a device wherein a single chute for the dispensing of one class of merchandise may be employed, in which case a single coin-controlled mechanism would be employed, or it may be used in a mechanism having a plurality of chutes, the delivery of the articles from each of which would be effected by a plurality of coin-controlled mechanisms. In the present illustration an apparatus having two chutes and two coin-controlled delivery devices has been illustrated for convenience of description, and in the present instance all the principal movable parts of the mechanism are mounted to swing upon a shaft 40, which shaft may rest upon pillows 41 upon the bed-plate and be prevented from rotating upon such pillows by engagement with faces 42, formed upon the standards 24. The bed-plate is shown as cut away between the pillows and the standards as having an arch formation straddling such cutaway portion, and some of the arches comprise the faces 42. Other of the arches are shown as of greater height than the perimeter of the shaft. It has been found in practice that all the arches do not need to bear upon the shaft to hold the same in place and from rotation. In practice a shaft of the proper size may be readily inserted in its position upon the pillow-blocks and be held down securely by the arches, the assembling being easy to accomplish and without danger of breaking an ordinary casting.

The lowermost package in each chute will be ejected for delivery upon depositing the proper coin in the apparatus, and in the present instance the ejector is shown as freely mounted upon the shaft 40 and comprises a body portion 43, having a pair of narrow fingers 44, which are adapted to pass through openings 45 in the back and bottom portion of the chute to engage the lowermost package, the front faces 46 engaging the edge of the package and the top faces 47 running upon the bottom of the package above the one which is in the process of being delivered to hold such package from descending. The ejector will carry in the present organization some trigger or device embodying an engaging face for the actuator, which trigger may be in the form of a lever and carried by some convenient portion of the ejector. If the ejector is a casting, as it will generally be, the trigger or lever will be carried by some part of the casting. In the present illustration an arm (indicated by 50) is shown rigid with the ejector and of course will rock with the same upon the shaft 40 and cause a movement in one direction to throw out the lowermost package and ride under the next package in the chute and upon rocking in the opposite direction will cause such ejector to move out of the chute and permit the package which it held away from the bottom to sink into a position to be engaged by the ejector upon the next excursion of the arm. Such arm is illustrated as carrying the pivot 51 of a lever 52, which has a coin-engaging face, in the present instance a lug 53, lying in the path of movement of the coin passing through the machine. Such path of movement in the present instance is controlled by a slot 55 in the front plate, through which the coin may be inserted and pass down a coin-chute 56 to the till 57 of the machine. The chute is cut away at 58 for the end of the lever 52, so that upon the coin passing down through the chute it will fall upon the lever and hold the lug 53 against the face 59 in the coin-chute. The lever carries an engaging face, in the present instance a lug 60, which may be engaged by one end 61 of an actuator, which in the present construction is shown in the form of a bell-crank lever, the other end having a finger-key 62, so that upon the coin depressing the end of the lever the engaging face thereon will come into the path of movement of the end of the bell-crank lever, and upon the depression of the finger-key the arm 50 will be given an excursion and swing the ejector through the package-chute, ejecting the lowermost package therein. The member which has been hereinbefore referred to as a trigger and a lever might be termed a "coin-lever" in view of the fact that the coin directly engages the same in the form herein illustrated, and it will be observed that such lever loses its center or power of movement after its engagement by the actuator and becomes fixed with the ejector, the actuator and ejector moving upon the same axis, whereby after the moving of the lever into the path of movement of the actuator and its firm engagement thereby the ejector, the lever, and the actuator move as one part upon a fixed center.

The lever is overweighted, in the present instance carrying a weight 65, so that upon the bell-crank arm reaching its limit of movement the arm 50 and the lever will be carried front and give a clearance between the engaging face on the end 61 and the engaging face 60, and the weight 65 will raise the engaging face 60 out of reach of the engaging face upon such end 61. The bell-crank lever may also carry an engaging face 66 to push the arm 50 to its normal position. Some suitable means may be employed for returning the bell-crank lever to its idle position. In the present instance a coiled spring 67 is shown engaging pins upon the frame and upon such lever. If the faces 60 and 61 adhere together for any reason, the coin-engaging lug upon its return to normal position will strike upon the face 59 of the chute-casing and cause a separation of such parts.

The several coin-chutes are shown as leading from the plate 32 at the front of the frame toward the back and then downwardly. The chute comprises in the present illustration two plates 70, fastened together by some suitable means, which may be screws, and also held in position by engagement between two lugs 72 upon the bed-plate of the frame, and it may here be remarked that the various parts of this mechanism are held together almost wholly by one part engaging another and by means of cast lugs, which will do away with the necessity of bolting the parts together, thus making for economy in time and labor. The chutes are held at their forward ends by engagement with lugs 73 at the rear of the coin-slots. The plates, or one of them, of course, will be chambered, so that a coin-passage may be provided, and in Fig. 3 it will be seen that the chamber is made by a flange 74, which has a ledge 75 overhanging a chamber 76. This is to prevent operating the machine by attaching a string to a coin or weight and letting it drop upon the lever and withdrawing it, as upon raising or drawing it up and down the string will be cut by the sharp edge of such ledge 75. It has also been found expedient to prevent the use of wires for tampering with mechanisms of this character, to which end the outer flange 77 of the chute is provided with a number of openings 78, so that should a wire be inserted in an attempt to induce it to turn down and trip the actuating devices it will pass out through one of the holes, and thus defeat the attempt at robbing the machine. As a further means of guarding the machine from attacks, the bell-crank lever carries a guard 79 to prevent any implement being thrust through the passage-way which such bell-crank traverses in its movements. It will be noticed that one end of the guard is rounded, so that it will occupy a position adjacent to the face of the plate 32, and the other end is substantially in a shape to lie against such face when the lever is pressed down. In some forms of the organization the guard 79 may upon the release of the actuator be permitted to strike the coin-lever and throw the same into such a position that the face 60 will be out of the path of movement of the part 61.

The plate 32 is shown as carrying upon its back plates or webs 80, so disposed that the operating end of the bell-crank levers will be received between the same in one instance and the other two will form guards for the sides of the machine and for the other bell-crank lever, which latter lever rests, in the present illustration, between the adjacent web and a standard 81 on the bed-plate 25, thus making it difficult for the insertion of an instrument to pick the lock by running the same sidewise.

For the purpose of guarding the lowermost package in the chute and also for preventing access to the ejector a door or gate (indicated by 85) may be provided, and in the present instance it is shown hanging upon pivots 86, finding bearings in the wings or flanges 80 on the plate 32, whereby as the package is thrown out by the ejector the gate will swing outwardly; but to prevent the swinging of the gate unless the arm 50 is swung an arm 87 is carried by one of the pivots of the gate and is in such a position that when the arm 50 is at its normal position and an attempt is made to swing the gate the arm 87 will strike the top of the arm 50 in such manner that it will be impossible for the gate to swing forward. After it has swung forward if it does not return to its normal position by itself the arm 50 in returning to its position will strike the arm 87 and cause the gate to close and prevent access to the packages or the operating mechanism at such region.

The coin passes from the chute, through the plate 25, into the till 57, which in the present instance comprises a box in the bottom part of the machine. Access to such box is had by means of a door 90, having lugs 91, engaged by the walls of openings 92 in the front of the box and closing by means of a key-controlled lock 93. The lower ends of the lugs 91 are bent outwardly, so that they will engage a flaring flange 94 at the base of the machine, and a pin 95 is carried by the door, which will enter a hole in a lug 96 on the bed-plate 25 and prevent the bed-plate 25 from being raised for the purpose of freeing it from the bolt of the lock 93. The bed-plate 25 is provided with lugs 97, that take under flanges or lugs on the rear of the box and prevent the bed-plate being drawn forwardly until slightly raised at its front portion. By means of this pin and the shape of the lugs 91 it is impossible for the till to be opened by raising the bed-plate and pulling the same from the door to permit the lock to become disengaged or to pull the door off its hinges by such raising.

When several varieties of merchandise are to be dispensed for a single machine, one in each chute, it will be convenient to designate the same by suitable labels adjacent to the coin-controlled mechanism in connection with the chute containing such merchandise. Such line of goods may be desired to be changed from time to time and at short notice, so that it will be found convenient to have a removable holder for the labels, but one which mischievous persons cannot tamper with. The plate 32 is shown as having rigid therewith a ledge 100, which will form the upper framing for the labels, which may be on cards or plates. The other framing member (designated in a general way by 101) comprises the ends 102 and the bottom 103 of the frame. A flange 104, surrounding the same, holds the plate or card from falling out. The plate 32 has an opening 105 to receive the head 106 of a fastening device, which fastening device is carried by a plate or thin arm 107, adapted to slide in a slot 108 and produce a secure joint when the plate 32 is interposed between the head and such frame. In this manner one or more frames may be secured in position and may be readily removable. For the purpose, however, of locking the frames one or more of them may be provided with a lug 109 to enter a hole 110 in the plate 32 and be received between one of the wings 80 and the standard 81, thus preventing the removal thereof when the parts are in their assembled position and the door closed, but permitting the same to be taken out by a person holding the proper key to the cabinet when it may be found necessary to change the labels. The slots 108 may be so placed relative to the openings 105 that the frames will all be moved in the same direction in assemblage and one frame will lock the preceding frame in position, in which case the last frame to be put in position, if provided with the locking-lug, will lock the series in place. The frames will be put in position when the plate 32 is loosely assembled and in which condition it may be moved sufficiently to permit the lug 109 to clear the standard 81, and after the plate has been brought to its normal position the lug will be locked between said standard and the wing 80.

The sides of the wings 80 from the front plate constitute sides for the ejection-orifices of the chute and may have outwardly-projecting lugs or feathers 111 to overlap the portion 27 of the chute and hold the same into the recesses in the bed-plate.

For the purpose of causing the packages to pass down the chute readily, particularly the last packages which will be in the chute, and also to prevent any catching of the upper packages a follower 112 may be mounted in the chute and may be sufficiently heavy to serve the purposes for which it is intended. The follower may also have an arm 113, projecting outwardly and adapted to pass behind the slot 55, as seen in dotted lines in the lower portion of Fig. 1, and enter a recess 114 in the coin-slot. Such position will be assumed by the arm 113 after the last package has been delivered from the chute and will prevent the insertion of coin in the apparatus after the packages for that particular coin-opening have been exhausted.

Of course it will be apparent that various changes of detail may be made as different requirements in use may demand.

Having thus described my invention, I claim—

1. In a delivery-cabinet, the combination with a housing, of a chute therein to contain articles of merchandise, brackets at the top of the housing to engage the chute and hold the same in place, a door for the housing, and a member carried by the door to engage the chute and press it against the brackets.

2. In a delivery-cabinet, the combination with a housing, of a box within the housing to hold merchandise, angle-brackets projecting from the top of the housing to engage two corners of the box, a door for the housing, and a ledge carried by the door to engage the box and press the same against the brackets.

3. The combination with a box having a top member and a bottom member, of a door hinged to one of them, means to lock the door in its closed position, a plate having an opening carried by the other of said members, and a pin carried by the door to engage the walls of such opening when the door is closed.

4. The combination with a bed-plate having at each end a pillow-block, of a shaft upon such blocks, and a series of plates carried by the bed-plate and arching around the shaft, the walls of some of which arches engage the shaft to hold it upon the blocks.

5. The combination with a bed-plate, of pillow-blocks carried thereby, a shaft on the blocks, means to hold the shaft thereon against rotation, a series of chutes to contain merchandise, an ejector for each chute loose upon such shaft, and operating mechanism for each ejector also loose upon the shaft.

6. The combination with a number of chutes to contain packages of merchandise, of a bed-plate upon which the same may rest; ejectors for each chute; a handle to operate the ejectors, a front plate for the machine having webs or wings projecting inwardly to guard the exits from the chutes; the handle projecting from an opening in the front plate and the said opening guarded by such wings or webs.

7. In a delivery-cabinet the combination with a sheet-metal receptacle for containing merchandise and having an integral shelf upon the bottom thereof provided with a number of passage-ways, an ejector carrying a number of fingers for traversing the passage-ways, and means for rocking the ejector.

8. In a delivery-cabinet the combination with top and bottom members, means of union therebetween, a sheet-metal sheathing constituting the walls of the cabinet engaging the said members and held in place thereby, and sheet-metal package-tubes engaging a portion of the top member and supported from the bottom member.

9. A delivery-cabinet embodying a casing open at one side, ejector mechanism, a plate carrying said ejector mechanism and readily removable from the casing and carrying a plate forming a partial closure for the open side of the casing and also carrying chute-standards, a door to complete the closure thereof resting upon such partial closure portion and readily removable, and package-chutes resting upon the said standards and engaging the door and held in position thereby.

10. In a delivery-cabinet the combination with substantially rigid top and bottom members, substantially rigid means of union therebetween, chute-holding abutments on the top member, chute-abutments supported from the bottom member, a sheet-metal sheathing constituting the walls of the cabinet and abutting the top and bottom and the means of union and held in place thereby, and sheet-metal package-chutes engaging the abutments on said top and bottom members and held in place thereby.

11. A cabinet having a top and bottom, corner-stanchions uniting the same, a sheet-metal sheathing therein constituting panels between the stanchions, a front plate for the cabinet, a door having faces to engage the edge and rear of such plate to afford a pivot and faces to engage the stanchions upon their fronts to determine the closing position of the door.

12. A delivery-cabinet having a casing, a package-storage chute within the casing, a discharge-chute leading without the casing and a shelf integrally connecting the same, passage-ways through the shelf and the storage-chute adjacent to the shelf, an ejector comprising a rocker, a pair of fingers traversing such passage-ways, to shift the packages from one chute to the other and to hold the next package from descending to the shelf.

13. A cabinet having a top and a bottom, angle-bar corner-stanchions uniting the same, a sheet-metal sheathing having bends lying within the angle of the stanchions and constituting panels between the same, upon all the sides but one, which side constitutes an open panel, and said sheathing having its vertical edges located adjacent to and beyond the bends at the sides of the panels adjoining the open panel and within the margins of the respective stanchions at the sides of the open panel, whereby the sides of the panels adjacent to the ending of the sheathing are each supported and stiffened by a bend constituting a transverse flange; and a door for such open panel supported by the said stanchions at the sides of the same.

Signed at Nos. 9 to 15 Murray street, New York, N. Y., this 16th day of January, 1904.

FREDERICK J. DOLE.

Witnesses:
JOHN O. SEIFERT,
H. R. BARTLETT.